(12) United States Patent
Chen et al.

(10) Patent No.: US 11,513,820 B2
(45) Date of Patent: Nov. 29, 2022

(54) METHOD FOR RESOURCE ALLOCATION, TERMINAL, AND COMPUTER-READABLE STORAGE MEDIUM

(71) Applicant: GUANGDONG OPPO MOBILE TELECOMMUNICATIONS CORP., LTD., Guangdong (CN)

(72) Inventors: Yan Chen, Guangdong (CN); Jie Cheng, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 183 days.

(21) Appl. No.: 17/006,275

(22) Filed: Aug. 28, 2020

(65) Prior Publication Data

US 2020/0394051 A1 Dec. 17, 2020

Related U.S. Application Data

(63) Continuation of application No. PCT/CN2019/077964, filed on Mar. 13, 2019.

(30) Foreign Application Priority Data

Mar. 13, 2018 (CN) .......................... 201810206376.6
May 31, 2018 (CN) .......................... 201810550970.7

(51) Int. Cl.
*G06F 9/451* (2018.01)
*G06F 11/34* (2006.01)
(Continued)

(52) U.S. Cl.
CPC ............ *G06F 9/451* (2018.02); *G06F 9/3877* (2013.01); *G06F 9/4401* (2013.01);
(Continued)

(58) Field of Classification Search
CPC .. G06F 9/3877; G06F 9/4401; G06F 9/44505; G06F 9/5027
See application file for complete search history.

(56) References Cited

U.S. PATENT DOCUMENTS 7,382,366 B1 * 6/2008 Klock .................... G06F 11/24
714/E11.154
2006/0212923 A1 * 9/2006 Soneira ................. G09G 5/003
348/E17.005

(Continued)

FOREIGN PATENT DOCUMENTS

CN 106559571 A 4/2017
CN 107426432 A 12/2017
(Continued)

OTHER PUBLICATIONS

Extended European Search Report for EP Application 19767053.2 dated Mar. 1, 2021. (10 pages).
(Continued)

*Primary Examiner* — Danny Chan
(74) *Attorney, Agent, or Firm* — Young Basile Hanlon & MacFarlane, P.C.

(57) ABSTRACT

A method for resource allocation, a terminal, and a computer-readable storage medium are provided. The method includes the following. A target application sends scene information to an operating system through a data channel established with the operating system, where the scene information is indicative of a running scene of the target application. The operating system acquires a target optimization configuration file corresponding to the scene information, where the target optimization configuration file contains optimization configuration information corresponding to different running time periods in the running scene, and the optimization configuration information is indicative of a manner for system resource allocation. The
(Continued)

operating system acquires target optimization configuration information corresponding to a current running time period from the target optimization configuration file. The operating system allocates system resources to the target application according to the target optimization configuration information.

20 Claims, 9 Drawing Sheets

(51) Int. Cl.
*G06F 9/38* (2018.01)
*G06F 9/4401* (2018.01)
*G06F 9/445* (2018.01)
*G06F 9/50* (2006.01)

(52) U.S. Cl.
CPC ........ *G06F 9/44505* (2013.01); *G06F 9/5027* (2013.01); *G06F 11/3428* (2013.01); *G06F 11/3433* (2013.01); *G06F 11/3495* (2013.01)

(56) References Cited

U.S. PATENT DOCUMENTS

| | | | | |
|---|---|---|---|---|
| 2010/0217846 | A1 | 8/2010 | Styles | |
| 2014/0313231 | A1* | 10/2014 | Wyman | G06T 3/0056 345/660 |
| 2014/0344469 | A1* | 11/2014 | Nicholls | H04L 65/762 709/231 |
| 2015/0286820 | A1* | 10/2015 | Sridhara | G06F 1/3206 713/320 |
| 2016/0365123 | A1* | 12/2016 | Wang | H04N 21/234363 |
| 2017/0182416 | A1* | 6/2017 | Lee | G06F 1/1605 |

FOREIGN PATENT DOCUMENTS

| | | |
|---|---|---|
| CN | 107450988 A | 12/2017 |
| CN | 107479970 A | 12/2017 |
| CN | 107515787 A | 12/2017 |
| CN | 107547744 A | 1/2018 |
| CN | 107577537 A | 1/2018 |
| CN | 107589998 A | 1/2018 |
| CN | 107621981 A | 1/2018 |
| CN | 107832141 A | 3/2018 |
| JP | 2018503184 A | 2/2018 |

OTHER PUBLICATIONS

English translation of the International search report issued in corresponding international application No. PCT/CN2019/077964 dated Jun. 12, 2019.
English translation of the first office action issued in corresponding CN application No. 201810550970.7 dated Mar. 18, 2020.
Indian Examination Report for IN Application 202017039317 dated Sep. 20, 2021. (7 pages).
Japanese Decision to Grant a Patent with English Translation for JP Application 2020-547383 dated Nov. 29, 2021. (5 pages).
Korean Office Action with English Translation for KR Application 10-2020-7025752 dated Nov. 11, 2021 (12 pages).
Australian Examination Report for AU Application 2019233201 dated Jun. 30, 2021. (4 pages).

* cited by examiner

METHOD FOR RESOURCE ALLOCATION, TERMINAL, AND COMPUTER-READABLE STORAGE MEDIUM

CROSS-REFERENCE TO RELATED APPLICATION(S)

This application is a continuation of International Application No. PCT/CN2019/077964, filed Mar. 13, 2019, which claims priority to Chinese Patent Application No. 201810206376.6, filed Mar. 13, 2018 and Chinese Patent Application No. 201810550970.7, filed May 31, 2018, the entire disclosures of all of which are hereby incorporated by reference.

TECHNICAL FIELD

This disclosure relates to the technical field of terminals, and in particular, to a method for resource allocation, a terminal, and a computer-readable storage medium.

BACKGROUND

With the development of mobile terminal technology, more and more kinds of applications are installed in mobile terminals. For example, game applications, social applications, video playback applications, instant messaging applications, and shopping applications are installed in the mobile terminal.

In order to improve use experience of the applications, mobile terminal manufacturers are constantly improving hardware configurations of the mobile terminal to improve the running speed and quality of the applications. For example, the mobile terminal is provided with high-performance central processing units (CPU) and graphics processing units (GPU) to improve the running speed and picture quality of the game application.

SUMMARY

According to an aspect, implementations of the disclosure provide a method for resource allocation. The method is applicable to a terminal with an operating system and a target application. The method includes the following.

The target application sends scene information to the operating system through a data channel established with the operating system, where the scene information is indicative of a running scene of the target application. The operating system acquires a target optimization configuration file corresponding to the scene information, where the target optimization configuration file contains optimization configuration information corresponding to different running time periods in the running scene, and the optimization configuration information is indicative of a manner for system resource allocation. The operating system acquires target optimization configuration information corresponding to a current running time period from the target optimization configuration file. The operating system allocates system resources to the target application according to the target optimization configuration information.

According to another aspect, implementations of the disclosure provide a terminal. The terminal includes at least one processor and a non-transitory computer readable storage. The computer readable storage is coupled to the at least one processor and stores at least one computer executable instruction thereon which, when executed by the at least one processor, causes the at least one processor to execute the method of the above aspect.

According to another aspect, implementations of the disclosure provide a non-transitory computer readable storage medium. The non-transitory computer readable storage medium is configured to store a computer program which, when executed by a processor, causes the processor to execute the method of the above aspect.

DETAILED DESCRIPTION

To make objectives, technical solutions, and advantages of the present application clearer, implementations of the application will be described in further detail below with reference to the accompanying drawings.

Figure 1:
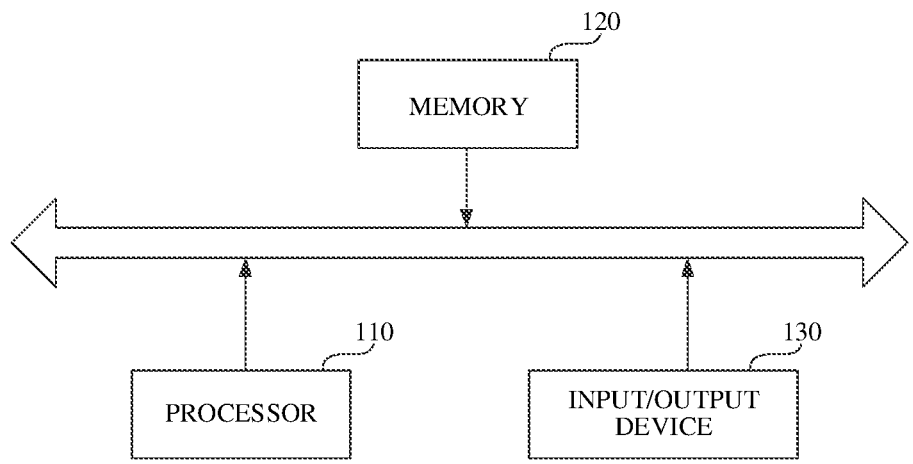
FIG. 1 illustrates a structural block diagram of a terminal according to implementations.

FIG. 1 illustrates a structural block diagram of a terminal according to implementations. The terminal can be a smart phone, a tablet computer, an e-book, or other electronic devices than can run applications. The terminal in the present disclosure can include one or more of the following components: at least one processor (such as a processor 110), a non-transitory computer readable storage (such as a memory 120), and an input/output device 130.

The processor 110 is configured to execute the method described above and can include one or more processing cores. The processor 110 connects various parts of the entire terminal by using various interfaces and lines, and executes or performs the instructions, programs, code sets, or instruction sets stored in the memory 120, and deploys the data stored in the memory 120, to execute various functions and processing data of terminal 100. In an example, the processor 110 can be implemented by using at least one hardware form of digital signal processing (DSP), field-programmable gate array (FPGA), and programmable logic array (PLA). The processor 110 may integrate one or a combination of a central processing unit (CPU), a graphics processing unit (GPU), and a modem. The CPU is mainly configured to handle the operating system, user interface, and applications; the GPU is responsible for rendering and drawing the content to be displayed; and the modem is used for processing wireless communication. It can be understood that the modem may not be integrated into the processor 110 and can be implemented by a single communication chip.

The memory 120 can include random access memory (RAM) and can also include read-only memory (ROM). In an example, the memory 120 includes a non-transitory computer-readable storage medium. The memory 120 can be used to store instructions, programs, codes, code sets, or instruction sets. The memory 120 can include a storage program area and a storage data area, where the storage program area can store instructions for implementing an operating system, instructions for implementing at least one function (such as a touch function, a sound playback function, an image playback function, etc.), and instructions for implementing the following method implementations. The operating system can be an Android system (including a system developed deeply based on the Android system), an IOS system (including a system developed deeply based on the IOS system), or other systems. The storage data area can store data (such as phone book, audio/video data, chat history data) created during the use of terminal.

The memory 120 can be divided into an operating system space and a user space. The operating system runs in the operating system space, and native applications and third-party applications run in the user space. In order to achieve good running effect for all different third-party applications, the operating system allocates corresponding system resources for different third-party applications. However, in the same third-party application, requirements on system resources are different under different application scenes. For example, in the scene of loading local resources, the third-party application has higher requirements on disk reading speed; in the scene of animation rendering, the third-party application has higher requirements on GPU performance. However, the operating system and the third-party application are independent of each other, and the operating system always cannot timely sense the current application scene of the third-party application. As a result, the operating system is unable to perform effective system resource adaptation according to specific application scenes of the third-party application.

Figure 2:
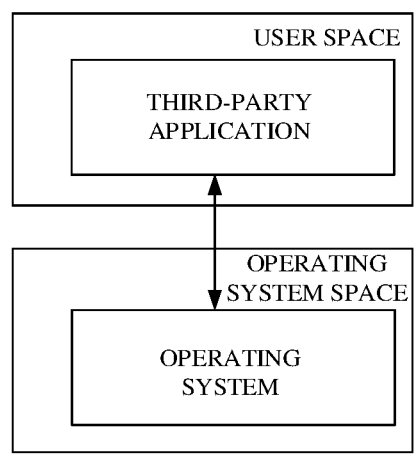
FIG. 2 is a schematic diagram illustrating communication between an operating system and a third-party application.

As illustrated in FIG. 2, in order for the operating system to be able to distinguish the specific application scenes of the third-party application, it is necessary to get through data communication between the third-party application and the operating system. As such, the operating system can obtain the current scene information of the third-party application at any time, and then perform effective system resource adaptation based on the current application scene.

Figure 3:
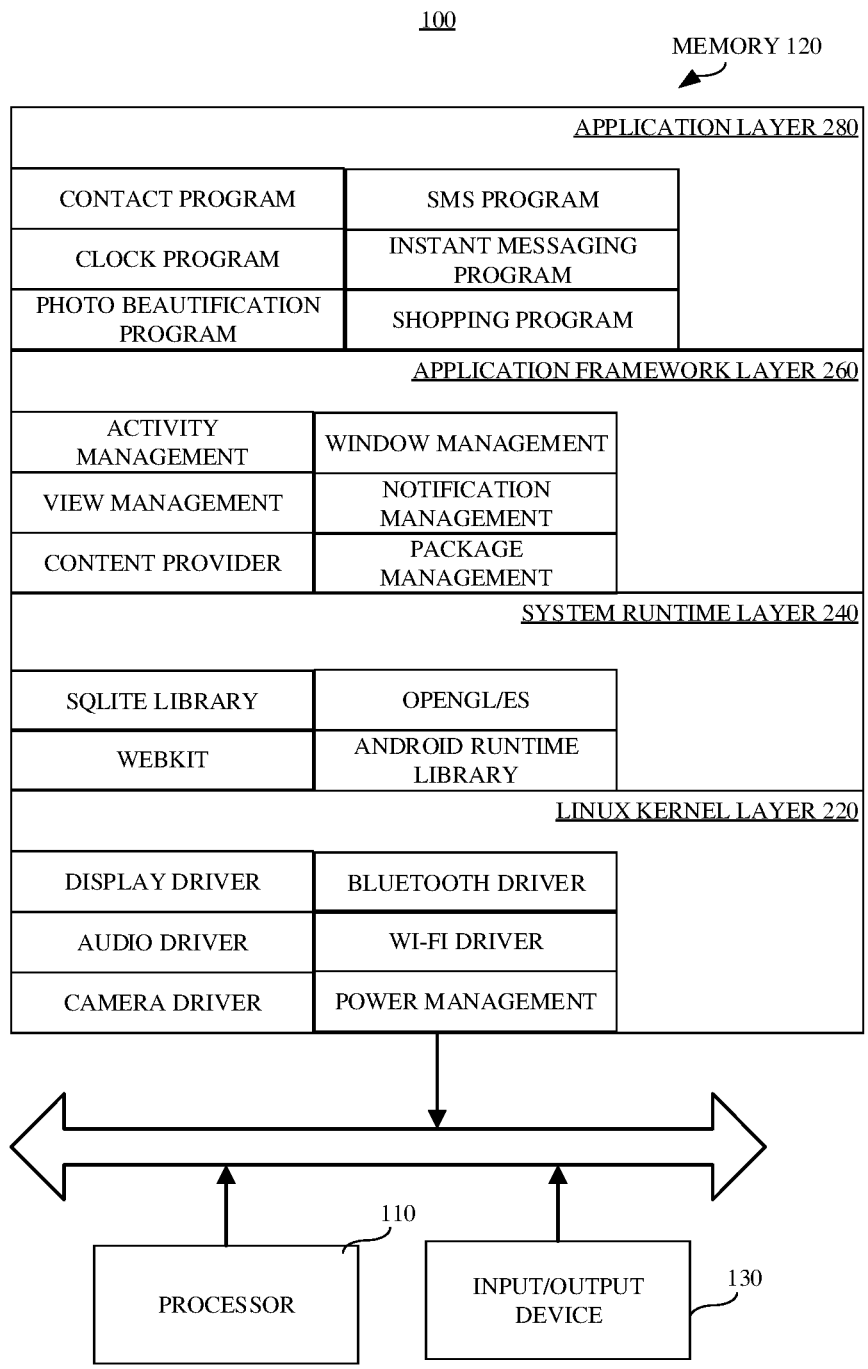
FIG. 3 is a schematic diagram illustrating an operating system according to implementations.

Taking the operating system of the Android system as an example, the programs and data stored in the memory 120 are illustrated in FIG. 3. The memory 120 stores a Linux kernel layer 220, a system runtime layer 240, an application framework layer 260, and an application layer 280. The Linux kernel layer 220, the system runtime layer 240, and the application framework layer 260 run in the operating system, and the application layer 280 runs in the user space. The Linus kernel layer 220 provides low-level drivers for various hardware of the terminal 100, such as display drivers, audio drivers, camera drivers, Bluetooth drivers, wireless fidelity (Wi-Fi) drivers, power management, and so on. The system runtime layer 240 provides major feature support for the Android system through some C/C++ libraries. For example, the SQLite library provides support for database, the OpenGL/ES library provides support for 3D drawing, and the Webkit library provides support for browser kernel. The Android runtime library is also provided in the system runtime layer 240, which mainly provides some core libraries for allowing developers to write Android applications using the Java language. The application framework layer 260 provides various APIs that may be used when building applications. Developers can also use these APIs to build their own applications, such as activity management, window management, view management, notification management, content providers, package management, call management, resource management, and location management. There is at least one application running in the application layer 280. These applications can be contact programs, short message (SMS) programs, clock programs, camera applications, etc. that are native to the operating system; they can also be third-party applications developed by third-party developers, such as game applications, instant messaging programs, photo beautification programs, shopping programs, etc.

Figure 4:
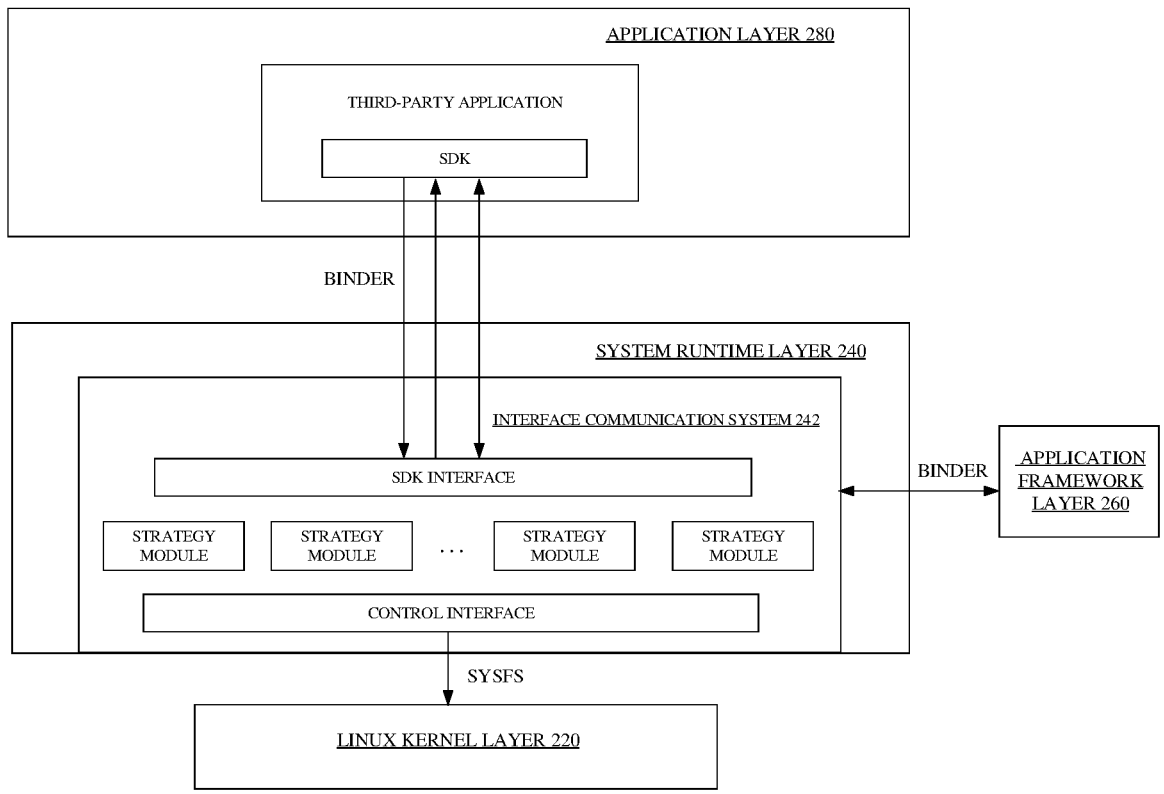
FIG. 4 is a schematic diagram illustrating communication between another operating system and a third-party application.

FIG. 4 illustrates a feasible communication manner between the operating system and the third-party application, where a software development kit (SDK) for communicating with the operating system is embedded in the third-party application.

The SDK includes several abstract application programming interfaces (APIs). The SDK is provided by operating system developers to third-party application developers and is embedded into the third-party application by the third-party application developer. After the third-party application is installed and run in the operating system, the API provided by the SDK embedded can be invoked to communicate with the operating system.

As illustrated in FIG. 4, the system runtime layer 240 can additionally include an interface communication system 242. The interface communication system 242 can be regarded as a subsystem in the operating system or as an application embedded in the operating system. The interface communication system 242 is provided with an SDK interface, and the third-party application invokes the API of the SDK embedded, to perform data communication with the SDK interface through Binder. In this way, data related to the application scenes of the third-party application can be transmitted to the operating system through the SDK embedded. With aid of the SDK embedded, the operating system can also actively transmit data to the third-party application, or two-way data transmission can be performed between the operating system and the third-party application.

Figure 5:
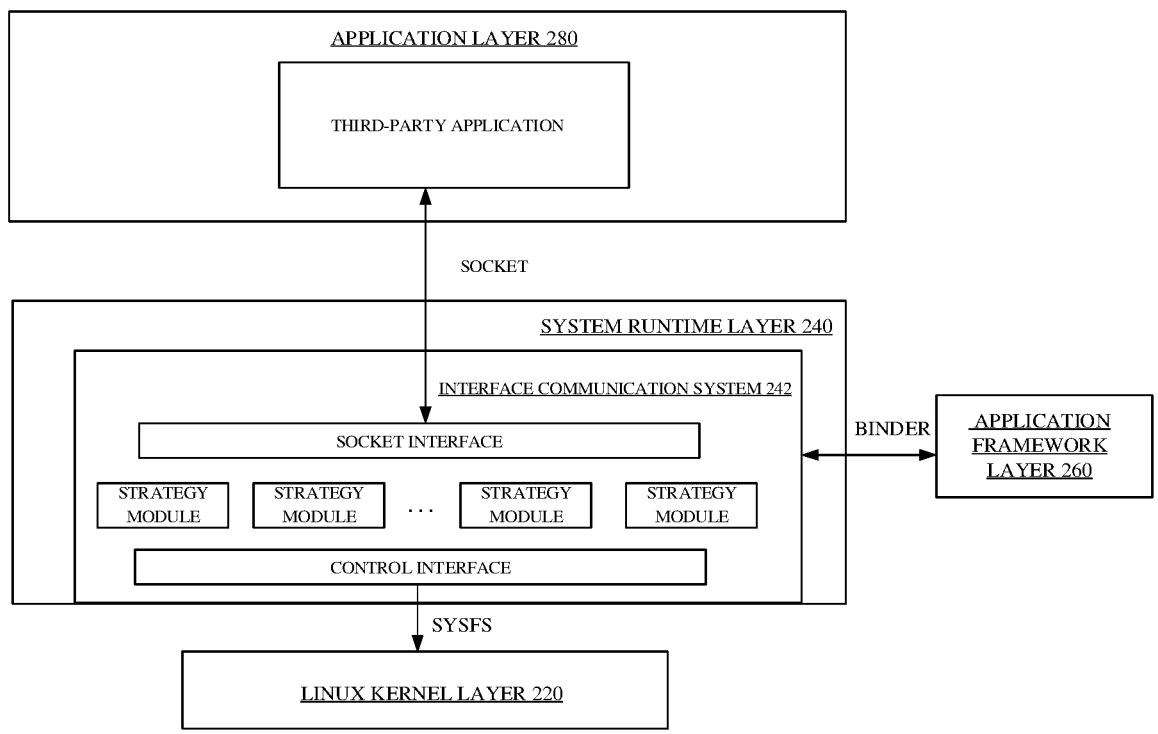
FIG. 5 is a schematic diagram illustrating communication between another operating system and a third-party application.

In another feasible communication manner, as illustrated in FIG. 5, the third-party application can also establish a long connection with a Socket interface of the interface communication system 242 in a Socket mode, and data related to the application scenes of the third-party application can be transmitted to the operating system through the long connection.

As illustrated in FIG. 4 and FIG. 5, the interface communication system 242 can be provided with different strategy modules. After receiving the data from the third-party application, the interface communication system 242 analyzes the data by using a corresponding strategy module of the third-party application to obtain a corresponding resource adaptation optimization strategy. Based on the resource adaptation optimization strategy obtained by the analysis, the interface communication system 242 informs the Linux kernel layer 220 through a control interface to perform system resource adaptation optimization, where communication between the control interface and the Linux kernel layer 220 can be achieved through Sysfs.

In an example, different strategy modules in the interface communication system 242 can correspond to different third-party applications (that is, setting strategy modules for different applications). Alternatively, different strategy modules correspond to different types of third-party applications (that is, setting strategy modules for different types of applications), or correspond to different system resources (that is, setting strategy modules for different system resources), or correspond to different application scenes (that is, setting strategy modules for different application scenes). The disclosure does not limit how the strategy module is set.

The interface communication system 242 can also communicate with the application framework layer 260 through Binder, for receiving foreground application information sent by the application framework layer 260. Thereafter, based on the foreground application information, system resource optimization is performed only for a third-party application currently running in the foreground.

Figure 6:
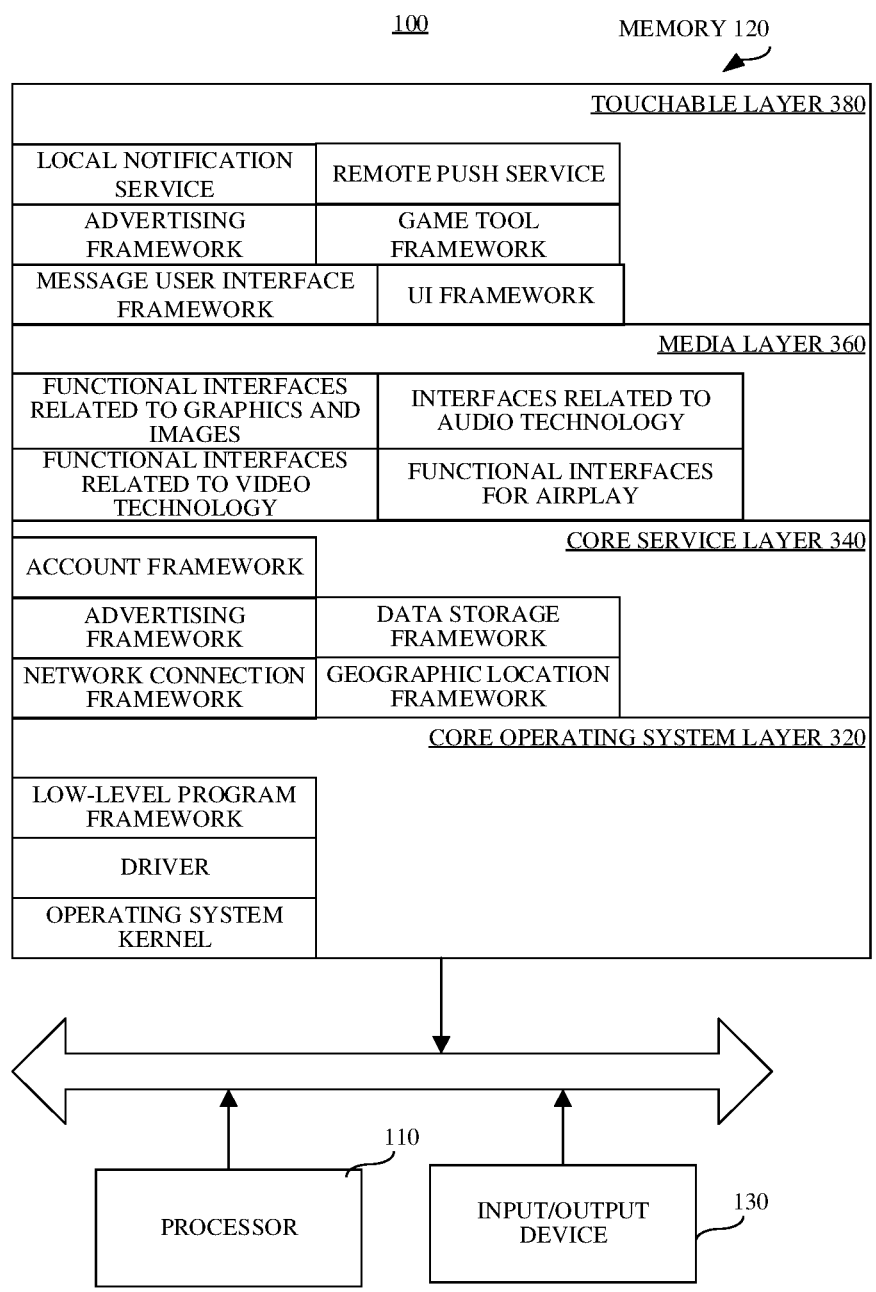
FIG. 6 is a schematic diagram illustrating an operating system according to other implementations.

Taking the operating system of the IOS system as an example, the programs and data stored in the memory 120 are illustrated in FIG. 6. The IOS system includes: a core operating system layer 320, a core service layer 340, a media layer 360, and a touchable layer (also called Cocoa touch layer) 380. The core operating system layer 320 includes an operating system kernel, drivers, and low-level program frameworks. These low-level program frameworks provide functions closer to the hardware for use by the program framework located at the core service layer 340. The core service layer 340 provides system services and/or program frameworks required by the application, such as a foundation framework, an account framework, an advertising framework, a data storage framework, a network connection framework, a geographic location framework, a motion framework, and so on. The media layer 360 provides audio-visual-related interfaces for applications, such as interfaces related to graphics and images, interfaces related to audio technology, interfaces related to video technology, and AirPlay interfaces for audio and video transmission technologies. The touchable layer 380 provides various commonly-used interface-related frameworks for application development. The touchable layer 380 is responsible for user touch interactive operations on the terminal 100. For example, a local notification service, a remote push service, an advertising framework, a game tool framework, a message user interface (UI) framework, a user interface UIKit framework, a map framework, and so on.

Among the frameworks illustrated in FIG. 6, frameworks related to most applications include, but are not limited to: a basic framework in the core service layer 340 and a UIKit framework in the touchable layer 380. The basic framework provides many basic object classes and data types and provides the most basic system services for all applications, regardless of the UI. The classes provided by the UIKit framework are basic UI class libraries for creating touch-based user interfaces. IOS applications can provide UI based on the UIKit framework, so it provides the application's infrastructure for building user interfaces, drawing, handling and user interaction events, responding to gestures, and more.

The manner and principle of implementing data communication between the third-party application and the operating system in the IOS system can refer to that in the Android system, which will not be repeated herein.

The input/output device 130 can include a touch screen. The touch screen is used for receiving a touch operation by a user using a finger, a touch pen, or any suitable object on or nearby, and for displaying user interfaces for various applications. The touch screen is usually disposed on the front panel of the terminal. The touch screen can be designed as a full screen, a curved screen, or a special-shaped screen. The touch screen can also be designed as a combination of a full screen and a curved screen, and a combination of a special-shaped screen and a curved screen, which is not limited in this example.

In addition, those skilled in the art can understand that the structure of the terminal illustrated in the above figures does not constitute a limitation on the terminal. The terminal can include more or fewer components than illustrated in the drawings, or combine certain components, or different component arrangements. For example, the terminal further includes components such as a radio frequency circuit, an input unit, a sensor, an audio circuit, a Wi-Fi module, a power supply, and a Bluetooth module, and details are not described herein again.

Figure 7:
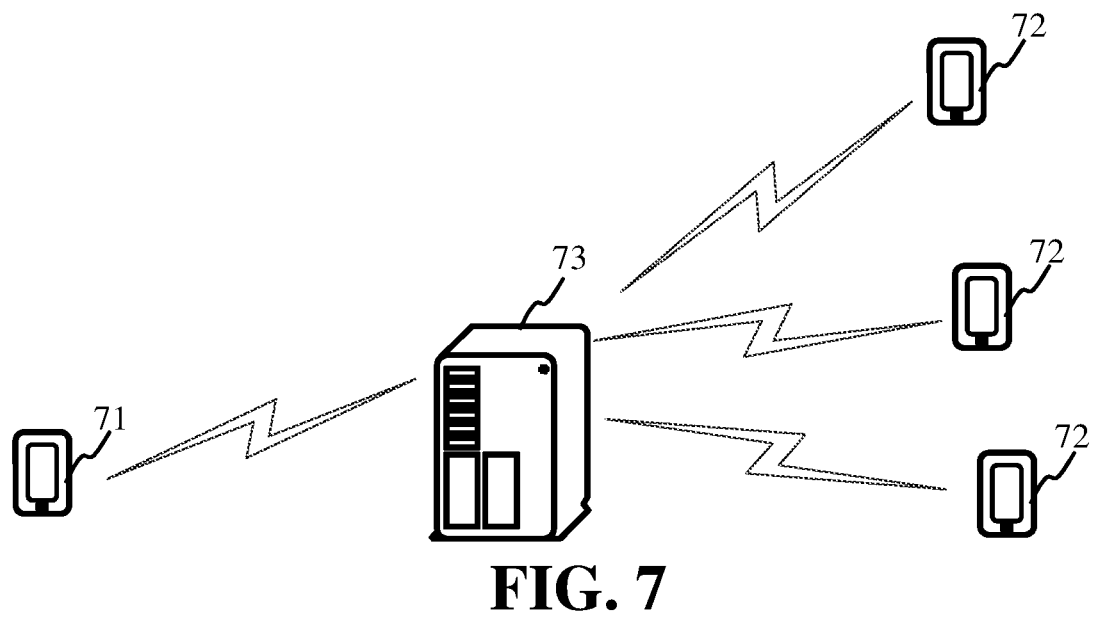
FIG. 7 is a schematic diagram illustrating an implementation environment according to implementations.

FIG. 7 is a schematic diagram illustrating an implementation environment according to implementations. The implementation environment includes a first terminal 71, at least one second terminal 72, and a server 73.

The first terminal 71 has a function for generating optimization configuration files and a function for transmitting optimization configuration information. The first terminal 71 runs an optimization tool provided by the terminal manufacturer, and the third-party application. When the third-party application is running, the optimization tool optimizes system resources to generate corresponding optimization configuration files.

The first terminal 71 is coupled with the server 73 through a wired network or a wireless network.

The server 73 is a server for storing optimization configuration files, and can be one server, or a server cluster or a cloud computing center including several servers. In an example, the server 73 is set up by the terminal manufacturer (or operating system developer), and stores optimization configuration files corresponding to terminals of different models produced by the terminal manufacturer, where the optimization configuration files are sent by the first terminal 71.

The second terminal 72 is coupled with the server 73 through a wired network or a wireless network.

The second terminal 72 is a terminal where a third-party application is installed and running. The method for resource allocation of implementations is applied to the second terminal 72. In the implementations, the second terminal 72 stores optimization configuration files corresponding to the third-party application. When the third-party application is running, the operating system of the second terminal 72 allocates system resources to the third-party application according to the optimization configuration files. In an example, the optimization configuration files are pre-stored in the second terminal 72 or obtained from the server 73 in real time.

For convenience of description, the following implementations are described by taking the terminal as an execution subject.

Figure 8:
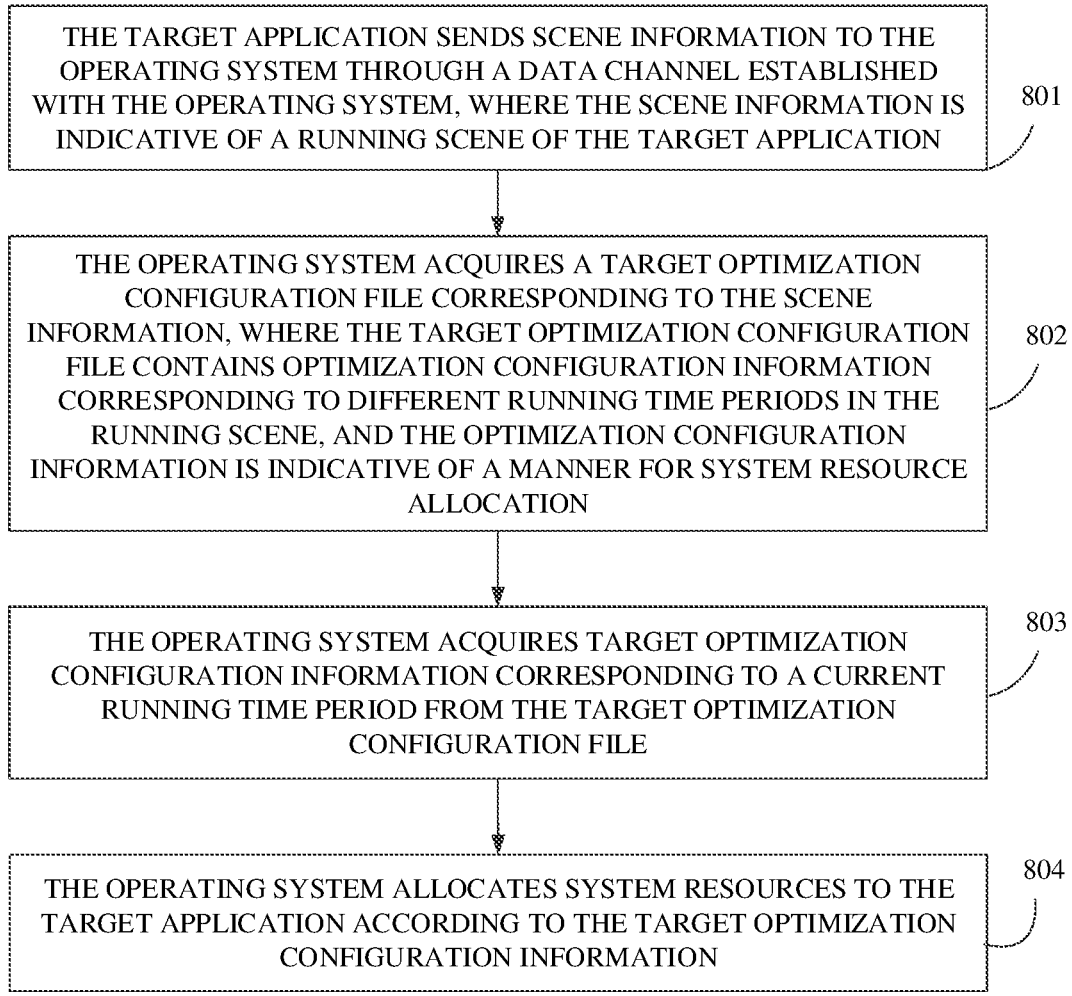
FIG. 8 is a flowchart illustrating a method for resource allocation according to implementations.

FIG. 8 is a flowchart illustrating a method for resource allocation according to implementations. The method is applicable to a terminal. The terminal runs with an operating system and a target application. The method begins at 801.

At block 801, the target application sends scene information to the operating system through a data channel established with the operating system, where the scene information is indicative of a running scene of the target application.

In an example, the target application is a third-party application developed by third-party application providers, for example, a game application, a video application, a shopping application, etc. The target application is installed and runs in a user space of the terminal. The implementations describe the game application as an example of the target application for illustration.

In an example, when the target application is started, the data channel is established with the operating system to implement data interaction between the operating system and the target application.

In at least one implementation, the data channel is established with the operating system of the terminal by the target application invoking an embedded SDK. In an example, when the target application is started, the target application invokes an API of the embedded SDK, to establish the data channel with the operating system through Binder.

In at least one implementation, the data channel is established with the operating system of the terminal by the target application in a socket mode. In an example, when the target application is started, the target application establishes a long connection with a Socket interface of the operating system in a Socket mode.

It should be noted that, during the establishment of the data channel, the operating system can authenticate the target application, so as to establish the data channel only with the specified application, to avoid security risks caused by illegal applications establishing data channels with the operating system.

The scene information is indicative of the (current) running scene of the target application. The scene information can include contents in a user interface currently displayed by the target application. Taking a game application as an example, the contents in the user interface includes interface elements such as virtual characters, virtual props, virtual backgrounds, and virtual skill icons. In a possible implementation manner, the scene information is a screenshot of the user interface currently displayed by the terminal. In another possible implementation manner, the scene information is identity information of interface elements in the user interface currently displayed.

The running scene of the target application can be classified according to the contents in the user interface currently displayed. A game application is taken as an example of the target application to explain the manner in which the target application is classified. In the game application, the running scene can include a main interface scene, a store scene, a loading scene, a battle scene, a team battle scene, a single battle scene, and an ADS (aim down sight) scene, which is not limited herein.

In the loading scene, the user interface displayed by the terminal includes an animation played within a preset duration after the target application is started and begins to run. In the team battle scene, the number of virtual characters in the user interface is greater than a first preset number (such as 5 people). In the single battle scene, the number of virtual characters in the user interface is less than a second preset number (for example, 2 people). In the ADS scene, virtual elements in the user interface can be magnified for a preset multiple within a set duration. The preset duration, the first preset number, the second preset number, the set duration, and the preset multiple can all be preset according to actual requirements, which is not limited herein.

At block 802, the operating system acquires a target optimization configuration file corresponding to the scene information, where the target optimization configuration file contains optimization configuration information corresponding to different running time periods in the running scene, and the optimization configuration information is indicative of a manner for system resource allocation.

After the scene information is obtained, the operating system further acquires the target optimization configuration file corresponding to the scene information. Different scene information corresponds to different optimization configuration files, that is, different running scenes correspond to different optimization configuration strategies.

For example, a correspondence between running scenes and optimization configuration files is illustrated in Table 1.

TABLE 1

| Running Scene | Optimization Configuration File |
|---|---|
| main interface scene | optimization configuration file A |
| battle scene | optimization configuration file B |
| store scene | optimization configuration file C |

In the implementations, each optimization configuration file contain at least two pieces of optimization configuration information, where different optimization configuration information correspond to different running time periods under the running scene. For example, the optimization configuration file includes:

Game_sence$_x$_config=[sence$_{x1}$, . . . , sence$_{xn}$],

Game_sence$_x$_time=[time$_1$, . . . , time$_n$], where Game_sence$_x$_config is a set of optimization configuration information under a running scene x, Game_sence$_x$_time represents different running time periods under the running scene x, and sence$_{xi}$ is optimization configuration information corresponding to a running time period time$_i$, where 1≤i≤n.

The optimization configuration information is used to improve running effect of the target application under the running scene. In at least one implementation, the optimization configuration information includes at least one of: an on-off state (or switch state) of each core in a CPU, a working frequency of each core in the CPU, a working frequency of a GPU, and a working frequency of a memory.

In terms of the working frequencies of the cores in the CPU, the CPU can include large cores (also called main processors or performance cores) and small cores (also called auxiliary processors or power consumption cores), where the working frequency of the large core is greater than that of the small core. One CPU can include multiple CPU cores, and the terminal can select which CPU core or cores to be used according to an application that is running. The switch state of each core in the CPU is used to indicate a state (i.e., an on-state or an off-state) of the core.

In an example, the optimization configuration information also includes other parameters that affect the running of the application, such as a read-write rate of the memory, a Wi-Fi network rate, and so on, which are not limited herein.

At block 803, the operating system acquires target optimization configuration information corresponding to a current running time period from the target optimization configuration file.

The operating system further obtains, according to the current running time period, the target optimization configuration information from the target optimization configuration file, so as to facilitate subsequent allocation of system resources based on the target optimization configuration information.

At block 804, the operating system allocates system resources to the target application according to the target optimization configuration information.

In an example, the operating system communicates with a kernel layer according to configuration parameters included in the target optimization configuration information, thereby instructing the kernel layer to configure corresponding system resources.

In an example, for system resources (such as CPU resources and GPU resources) that can be controlled by direct communication, the operating system directly invoke an abstract interface corresponding to such system resources to complete resource allocation. For system resources (such as network resources) that cannot be directly accessed and controlled by the operating system, the operating system uses a proxy manner to indirectly communicate with a subsystem corresponding to such system resources (for example, a subsystem corresponding to network resources can be a Wi-Fi subsystem), to complete system resource allocation.

In an example, when the life cycle of the target application ends (i.e., the process of the target application ends), that is, when a process end signal of the target application is received, the operating system disconnects connection with the target application and clears the data channel, so as to establish connections with other applications.

According to the implementations, when the target application is running, the target application can send the scene information indicative of the running scene of the target application to the operating system through the data channel established with the operating system. The operating system can acquire the target optimization configuration file corresponding to the scene information, acquire the target optimization configuration information corresponding to the current running time period from the target optimization configuration file, and further allocate system resources to the target application according to the target optimization configuration information. Compared with simply improving hardware performance of the terminal, the operating system of the implementations can allocate system resources to the application effectively according to the application scene of the application, so that the application can achieve good running effect in all different application scenes and reduce dependence on hardware of the terminal. Furthermore, the application scene is further classified in terms of the time dimension, and for different running time periods in a same application scene, the operating system can allocate corresponding system resources to the application, such that the application can achieve good running effect in all different running time periods in the same application scene.

In at least one implementation, the operating system acquires the target optimization configuration file corresponding to the scene information as follows.

The operating system acquires an application identity of the target application; The operating system acquires, according to the application identity, at least two optimization configuration files corresponding to the target application, where different optimization configuration files correspond to different running scenes of the target application. The operating system acquires the target optimization configuration file from the at least two optimization configuration files according to a scene identity in the scene information.

In at least one implementation, the scene information further includes a target frame rate in the running scene, and the operating system acquires the target optimization configuration file from the at least two optimization configuration files according to the scene identity in the scene information as follows.

The operating system acquires the target optimization configuration file from the at least two optimization configuration files according to the target frame rate and the scene identity. In a same running scene, different frame rates correspond to different optimization configuration files.

In at least one implementation, the operating system acquires the target optimization configuration information corresponding to the current running time period from the target optimization configuration file as follows.

The operating system acquires an entry time point at which the target application enters into the running scene. The operating system calculates a running duration according to a current time point and the entry time point. The operating system determines the current running time period according to the running duration. The operating system determines optimization configuration information that matches the current running time period as the target optimization configuration information.

In at least one implementation, after the operating system allocates system resources to the target application according to the target optimization configuration information, a frame rate standard deviation of the target application is lower than a threshold, and power consumption of the terminal is lower than that of the terminal in other manners for system resource allocation. The frame rate standard deviation is a standard deviation between a real-time frame rate of the target application and the target frame rate in the running scene.

In at least one implementation, the following is further conducted. An optimization configuration file of the target application is generated by an optimization tool, where the optimization tool is used to allocate, in a same running scene of the target application, system resources to the target application according to resource configuration parameters corresponding to sub-scenes (or atomic scenes), and different sub-scenes correspond to different resource configuration parameters. For each sub-scene, a frame rate standard deviation of the target application and power consumption of the terminal are calculated in different running time periods. For each running time period, a sub-scene where the frame rate standard deviation is lower than a threshold and the terminal has a lowest power consumption is determined as a target sub-scene corresponding to the running time period. The optimization configuration file corresponding to the running scene is generated according to the target sub-scene corresponding to each running time period.

In at least one implementation, the following is further conducted. The operating system sends a configuration file acquiring request to a server, where the configuration file acquiring request contains a terminal model of the terminal and an application identity of the target application, and the server is configured to feed back to the terminal an optimization configuration file that matches the terminal model and the application identity. The operating system receives and stores the optimization configuration file fed back by the server.

In order to generate an optimization configuration file suitable for a third-party application, in a possible implementation manner, both the third-party application and an optimization tool are installed in the terminal by developers, and the optimization tool performs system resource adaptation during running of the third-party application, collects running data of the third-party application, and generates the optimization configuration file suitable for the third-party application based on the running data. In an example, the optimization configuration file is generated as follows.

First, in a same running scene of the target application, system resources are allocated to the target application according to resource configuration parameters corresponding to sub-scenes.

In an example, n sub-scenes are predefined in the operating system of the terminal, and a set of n sub-scenes can be expressed as:

$$Sence=[sence_1, \ldots, sence_n], n \geq 1,$$

where Sence represents the set of n sub-scenes, and $sence_i$ represents the i-th sub-scene, where $1 \leq i \leq n$.

In an example, each sub-scene corresponds respective resource configuration parameters and different sub-scenes correspond to different resource configuration parameters. The resource configuration parameters can include at least one of: an on-off state of each core in a CPU, a working frequency of each core in the CPU, a working frequency of a GPU, and a working frequency of a memory. The resource configuration parameters can further include parameters corresponding to other system resources, such as disk read-write resources, network resources, and so on, which are not limited herein.

In an example, resource configuration parameters corresponding to the i-th sub-scene $sence_i$ are as follows:

$$sence_i = \begin{bmatrix} cpu_{i1}\_fre \\ cpu_{i1}\_stat \\ \ldots \\ cpu_{im}\_fre \\ cpu_{im}\_stat \\ \ldots \\ gpu_i\_fre \\ mem_i\_fre \end{bmatrix},$$

where m denotes the number of cores of the CPU and $m \geq 1$; $cpu_{ij}\_fre$ denotes a working frequency of the j-th core in the CPU under $sence_i$ and $1 \leq j \leq m$; $cpu_{ij}\_stat$ denotes an on-off state (where "0" represents "off" and "1" represents "on") of the j-th core in the CPU under $sence_i$; $gpu_i\_fre$ denotes a working frequency of the GPU under $sence_i$; $mem_i\_fre$ denotes a working frequency of the memory under $sence_i$.

In an example, different terminals have different hardware configuration, for example, the CPU of some terminals includes two large cores and two small cores, and the CPU of other terminals includes four large cores and four small cores. Therefore, different terminals have different sub-scenes predefined in their operating systems.

The optimization tool can be used by the target application developer (or terminal manufacturer) to allocate system resources to the target application according to the resource configuration parameters corresponding to each sub-scene, that is, run the target application in various sub-scenes.

Second, for each sub-scene, a frame rate standard deviation of the target application and power consumption of the terminal are calculated in different running time periods.

In order to determine running effect of the target application and the power consumption of the terminal in different sub-scenes, in a possible implementation manner, the optimization tool performs data collection (including frame rate data of the target application and power consumption data of the terminal) while the target application is running, such that in different running time periods, the frame rate standard deviation (or frame rate variance) of the target application and the power consumption of the terminal can be calculated based on the collected data. In an example, the running time period can be divided according to a fixed time interval, for example, the running time period is 5 s.

For example, the formula for calculating the frame rate standard deviation is as follows:

$$\sigma_{frame} = \sqrt{\frac{1}{N}\sum_{i=1}^{N}(x_i - u_0)^2},$$

where $\sigma_{frame}$ is the frame rate standard deviation, used to measure fluctuation of frame rate; N denotes N sampling points in a running time period; $x_i$ is a frame rate collected at the i-th sampling point; $u_0$ is a target frame rate (such as 30 fps) under the current running scene.

The power consumption of the terminal can be calculated using the following formula:

$$Power_{cost} = \sum_{i=0}^{N} Current_i \times Voltage_i \times t,$$

where $Power_{cost}$ is power consumption of the terminal during a running time period; N denotes N sampling points in the running time period; $Current_i$ is current of the terminal collected at the i-th sampling point; $Voltage_i$ is voltage of the terminal collected at the i-th sampling point; t is an interval of the sampling points.

Third, for each running time period, a sub-scene where the frame rate standard deviation is lower than a threshold and the terminal has a lowest power consumption is determined as a target sub-scene corresponding to the running time period.

Furthermore, in order to achieve steady running of the target application (that is, the frame rate is stable) and maintain low power consumption during each running time period, in an example, for each running time period, the terminal first excludes a sub-scene(s) whose frame rate standard deviation is greater than the threshold (for example, the threshold can be 5) and determines a sub-scene with the lowest power consumption from sub-scenes whose frame rate standard deviation is lower than the threshold as the target sub-scene corresponding to the running time period.

In other possible implementation manners, the terminal can calculate a weighted score corresponding to each sub-scene according to the frame rate standard deviation and its corresponding first weight as well as the power consumption and its corresponding second weight, and determine a sub-scene with the highest weighted score as the target sub-scene corresponding to the running time period.

Fourth, the optimization configuration file corresponding to the running scene is generated according to the target sub-scene corresponding to each running time period.

Furthermore, the optimization tool generates the optimization configuration file corresponding to the running scene according to each running time period and the target sub-scene corresponding to each running time period. Resource configuration parameters corresponding to the target sub-scene are optimization configuration information in the optimization configuration file.

In an example, the optimization tool generates a set of optimization configuration files corresponding to the target application according to optimization configuration files corresponding to different running scenes.

In an example, after the set of optimization configuration files corresponding to the target application is generated, the terminal uploads the set of optimization configuration files to a server of the terminal manufacturer, so that the terminal can download from the server subsequently.

For example, as illustrated in FIG. 7, after the first terminal 71 generates an optimization configuration file, the optimization configuration file is uploaded to the server 73. Later, the second terminal 72 can download the optimization configuration file from the server 73.

Figure 9:
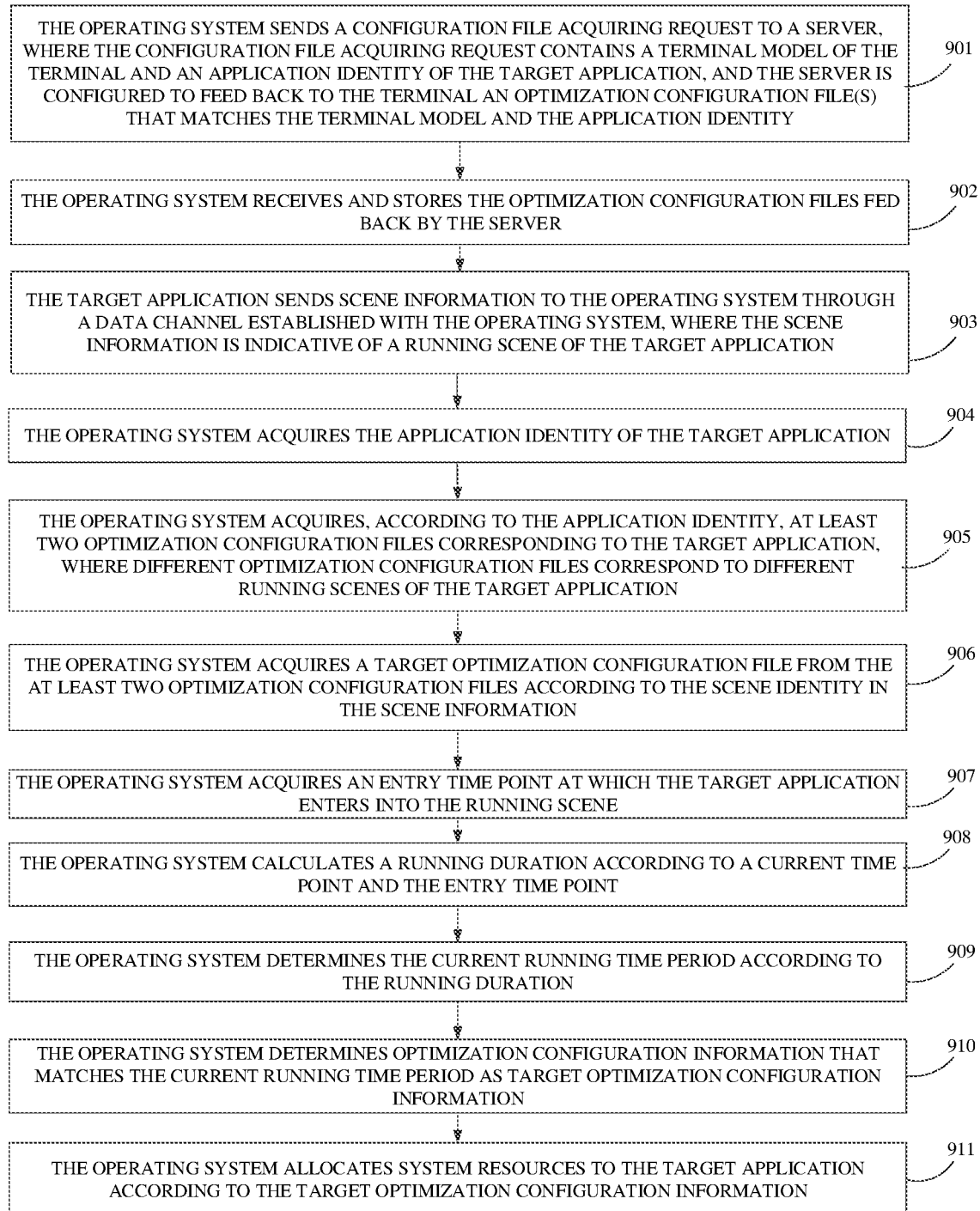
FIG. 9 is a flowchart illustrating a method for resource allocation according to other implementations.

FIG. 9 is a flowchart illustrating a method for resource allocation according to other implementations. The method is applicable to a terminal with an operating system and a target application. The method begins at 901.

At 901, the operating system sends a configuration file acquiring request to a server, where the configuration file acquiring request contains a terminal model of the terminal and an application identity of the target application, and the server is configured to feed back to the terminal an optimization configuration file(s) that matches the terminal model and the application identity.

In an example, the server stores optimization configuration files corresponding to different applications, and the optimization configuration files are uploaded to the server by the application developer (or terminal manufacturer). When hardware configuration of terminals is much similar, terminals of different models can correspond to the same optimization configuration files. When hardware configuration of terminals is less similar, terminals of different models can correspond to different optimization configuration files.

For example, a correspondence between terminal models, applications, and optimization configuration files is illustrated in Table 2.

TABLE 2

| terminal model | application | optimization configuration file |
| --- | --- | --- |
| A123, A124 | xx game | optimization configuration files A, B, and C |
| A123, A124 | xx video | optimization configuration files D and E |
| A250, A252 | xx game | optimization configuration files F, G, and H |
| A250, A252 | xx video | optimization configuration files I and J |

Limited by the storage space, the terminal is unable to store optimization configuration files corresponding to all applications. In order to perform system resource optimization for the installed application(s), in a possible implementation manner, when the operating system detects the download of the target application, the operating system sends the configuration file acquiring request containing the terminal model and the application identity to the server. After the server receives the configuration file acquiring request, the server searches for the optimization configuration files that match the terminal model and the application identity, and feeds the optimization configuration files back to the terminal.

As the application is continuously updated, its corresponding optimization strategy will change accordingly. In order to ensure that the operating system can optimize system resources for the application according to the latest optimization configuration files, in a possible implementation manner, the operating system sends the configuration file acquiring request to the server every predetermined time interval to request the latest optimization configuration files corresponding to the target application.

In other possible implementation manners, when the optimization configuration files are updated, the server can actively push updated optimization configuration files to the terminal installed with the target application, which is not limited herein.

At 902, the operating system receives and stores the optimization configuration files fed back by the server.

After the terminal receives the optimization configuration files from the server, the operating system associates the optimization configuration files with the target application and stores the optimization configuration files.

At 903, the target application sends scene information to the operating system through a data channel established with the operating system, where the scene information is indicative of a (current) running scene of the target application.

The operation 903 is implemented similar as the above operation 801, which will not be repeated herein.

In an example, the scene information contains a scene identity of the current running scene.

At 904, the operating system acquires the application identity of the target application.

Since the terminal can store optimization configuration files corresponding to different applications, in order to determine optimization configuration files suitable for the target application, the operating system needs to obtain the application identity of the target application.

In a possible implementation manner, as illustrated in FIG. 4, the operating system obtains the foreground application information from the application framework layer 260, and determines a foreground application identity contained in the foreground application information as the application identity of the target application.

In other possible implementation manners, the operating system can obtain the application identity of the target application in other ways, which is not limited herein.

At 905, the operating system acquires, according to the application identity, at least two optimization configuration files corresponding to the target application, where different optimization configuration files correspond to different running scenes of the target application.

Because one application has different running scenes and different running scenes have different requirements on system resources, the operating system obtains, according to the application identity, optimization configuration files corresponding to different running scenes of the target application. The correspondence between optimization configuration files and running scenes can be illustrated in Table 1.

With reference to the data illustrated in Table 2, the operating system obtains optimization configuration files A, B, and C according to the application identity "xx game".

At 906, the operating system acquires a target optimization configuration file from the at least two optimization configuration files according to the scene identity in the scene information.

Furthermore, the operating system obtains, according to the scene identity, the target optimization configuration file suitable for the current running scene from the at least two optimization configuration files.

In an example, in combination with the data illustrated in Table 1, the operating system determines optimization configuration file B as the target optimization configuration file according to the scene identity "battle scene".

For the same running scene of the same application, this running scene can be set to run at different frame rates according to user requirement. For example, for the battle scene of the game application, battle frames (or battle pictures) can be set by the user to be displayed at 30 fps or at 60 fps. At different frame rates, system resources required to ensure smooth running of the application under this running scene are different. Therefore, under the same running scene, different frame rates can correspond to different optimization configuration files. In an example, under the same running scene, a correspondence between different optimization configuration files and frame rates is illustrated in Table 3.

TABLE 3

| frame rate | optimization configuration file |
|---|---|
| 30 fps or Hz | optimization configuration file B1 |
| 60 fps | optimization configuration file B2 |
| 100 fps | optimization configuration file B3 |

In order to ensure that the operating system can obtain an optimization configuration file corresponding to a target frame rate under the current running scene, in a possible implementation manner, the target application obtains the target frame rate under the current running scene and adds the target frame rate to the scene information. For example, the scene information sent by the target application contains the scene identity "battle scene" and the target frame rate "60 fps".

Correspondingly, the operating system determines the target optimization configuration file according to the target frame rate and the scene identity.

At 907, the operating system acquires an entry time point at which the target application enters into the running scene.

When determining a current running time period under the running scene, the operating system first obtains the entry time point at which the target application enters into the running scene. In a possible implementation manner, the target application sends the scene information upon entering into the running scene, and thus the operating system can determine a time point at which the scene information is sent as the entry time point.

For example, the operating system obtains an entry time point of 12:10:59.

At 908, the operating system calculates a running duration according to a current time point and the entry time point.

Furthermore, the operating system obtains the current time point, so as to calculate the running duration according to the current time point and the entry time point.

For example, if the current time point is 12:11:02 and the entry time point is 12:10:59, the operating system calculates that the running duration is 3 s.

At 909, the operating system determines the current running time period according to the running duration.

The terminal stores a correspondence between running time periods and optimization configuration information. For example, the correspondence is illustrated in Table 4.

TABLE 4

| running time period | T1 (0 s-5 s) | T2 (5 s-10 s) | T3 (10 s-15 s) | T3 (15 s-∞) |
|---|---|---|---|---|
| optimization configuration information B001 | optimization configuration information B002 | optimization configuration information B003 | optimization configuration information B004 | |

In an example, the operating system determines a running time period corresponding to the running duration as the current running time period based on the data illustrated in Table 4.

For example, in conjunction with the above operations, the operating system determines that the current running time period is T1.

At 910, the operating system determines optimization configuration information that matches the current running time period as target optimization configuration information.

For example, in conjunction with the above operations, the operating system determines optimization configuration information B001 as the target optimization configuration information. The target optimization configuration information contains a series of (system) resource configuration parameters.

At 911, the operating system allocates system resources to the target application according to the target optimization configuration information.

The operating system allocates system resources to the target application according to the system resource configuration parameters in the target optimization configuration information.

After the operating system allocates system resources to the target application according to the target optimization configuration information, a frame rate standard deviation of the target application is lower than a threshold and power consumption of the terminal is lower than that of the terminal in other manners for system resource allocation (manners for system resource allocation corresponding to sub-scenes). Therefore, the frame rate of the target application is stable and the power consumption of the terminal is low. The frame rate standard deviation is a standard deviation between a real-time frame rate of the target application and the target frame rate in the running scene.

According to the implementations, the operating system determines the running duration according to the entry time point of entering the running scene and current time point, and further determines a running time period to which the running duration belongs as a target running time period, which improves the accuracy of determining the running time period.

According to the implementations, the operating system obtains the target optimization configuration file according to the target frame rate and the scene identity under the current running scene, and determines that the obtained target optimization configuration file is suitable for the running scene at a current frame rate.

The following describes device implementations, which can be used to execute the method implementations. For details not disclosed in the device implementations, reference can be made to the method implementations.

Figure 10:
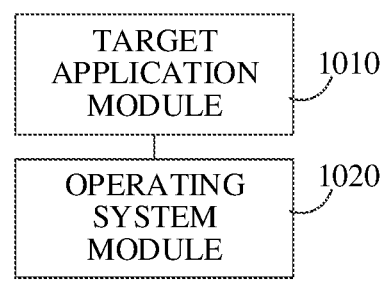
FIG. 10 is a block diagram illustrating a device for resource allocation according to implementations.

FIG. 10 is a block diagram illustrating a device for resource allocation according to implementations. The device can be implemented as part or all of the second terminal in FIG. 7 through software and/or hardware. The device includes a target application module 1010 and an operating system module 1020.

The target application module 1010 is configured to send scene information to an operating system through a data channel established with the operating system, where the scene information is indicative of a running scene of a target application. The operating system module 1020 is configured to acquire a target optimization configuration file corresponding to the scene information, where the target optimization configuration file contains optimization configuration information corresponding to different running time periods in the running scene, and the optimization configuration information is indicative of a manner for system resource allocation (or an allocation manner for system resources); acquire, from the target optimization configuration file, target optimization configuration information corresponding to a current running time period; allocate system resources to the target application according to the target optimization configuration information.

In at least one implementation, in terms of acquiring the target optimization configuration file corresponding to the scene information, the operating system module 1020 is configured to: acquire an application identity of the target application; acquire, according to the application identity, at least two optimization configuration files corresponding to the target application, where different optimization configuration files correspond to different running scenes of the target application; acquire the target optimization configuration file from the at least two optimization configuration files according to a scene identity in the scene information.

In at least one implementation, the scene information further includes a target frame rate in the running scene, and in terms of acquiring the target optimization configuration file from the at least two optimization configuration files according to the scene identity in the scene information, the operating system module 1020 is configured to acquire the target optimization configuration file from the at least two optimization configuration files according to the target frame rate and the scene identity. In a same running scene, different frame rates correspond to different optimization configuration files.

In at least one implementation, in terms of acquiring the target optimization configuration information corresponding to the current running time period from the target optimization configuration file, the operating system module 1020 is configured to: acquire an entry time point at which the target application enters into the running scene; calculate a running duration according to a current time point and the entry time point; determine the current running time period according to the running duration; determine optimization configuration information that matches the current running time period as the target optimization configuration information.

In at least one implementation, after the operating system allocates system resources to the target application according to the target optimization configuration information, a frame rate standard deviation of the target application is lower than a threshold and power consumption of the terminal is lower than that of the terminal in other manners for system resource allocation. The frame rate standard deviation is a standard deviation between a real-time frame rate of the target application and the target frame rate in the running scene.

In at least one implementation, the target application has an optimization configuration file generated by an optimization tool, and the optimization tool is used to allocate, in a same running scene of the target application, system resources to the target application according to resource configuration parameters corresponding to sub-scenes, where different sub-scenes correspond to different resource configuration parameters. For each sub-scene, a frame rate standard deviation of the target application and power consumption of the terminal are calculated in different running time periods. For each running time period, a sub-scene where the frame rate standard deviation is lower than a threshold and the terminal has a lowest power consumption is determined as a target sub-scene corresponding to the running time period. The optimization configuration file corresponding to the running scene is generated according to the target sub-scene corresponding to each running time period.

In at least one implementation, the operating system module 1020 is further configured to: send a configuration file acquiring request to a server, where the configuration file acquiring request contains a terminal model of the terminal and an application identity of the target application and the server is configured to feed back to the terminal an optimization configuration file that matches the terminal model and the application identity; receive and store the optimization configuration file fed back by the server.

In at least one implementation, the data channel is established with the operating system by the target application invoking an embedded SDK or by the target application in a socket mode.

In at least one implementation, the optimization configuration information includes at least one of: an on-off state of each core in a CPU, a working frequency of each core in the CPU, a working frequency of a GPU, and a working frequency of a memory.

According to the implementations, when the target application is running, the target application can send the scene information indicative of the running scene of the target application to the operating system through the data channel established with the operating system. The operating system can acquire the target optimization configuration file corresponding to the scene information, acquire the target optimization configuration information corresponding to the current running time period from the target optimization configuration file, and further allocate system resources to the target application according to the target optimization configuration information. Compared with simply improving hardware performance of the terminal, the operating system of the implementations can effectively allocate system resources to the application according to the application scene of the application, so that the application can achieve good running effect in different application scenes and reduce dependence on hardware of the terminal. Furthermore, the application scene is further subdivided from the time dimension, and for different running time periods in a same application scene, the operating system can allocate corresponding system resources to the application, such that the application can achieve good running effect in different running time periods in the same application scene.

According to the implementations, the operating system determines the running duration according to the entry time point of entering the running scene and current time point, and further determines a running time period to which the running duration belongs as a target running time period, which improves the accuracy of determining the running time period.

According to the implementations, the operating system obtains the target optimization configuration file according to the target frame rate and the scene identity in the current running scene, and determines that the obtained target optimization configuration file is suitable for the running scene at a current frame rate.

It should be noted that, when the aforesaid device realizes its functions, the division of the aforesaid various functional modules as described are just examples. In an actual application, the aforesaid functions can be assigned to different functional modules to be accomplished, that is, an inner structure of the device is divided into different functional modules so as to accomplish all or part of functions described above. Regarding a specific working process of the aforesaid device, reference can be made to a corresponding process of the aforesaid method implementations, which is not repeatedly described herein.

In at least one implementation, a non-transitory computer readable storage medium is further provided. The non-transitory computer readable storage medium is configured to store a computer program which, when executed by a processor, causes the processor to implement various operations of the above method implementations.

In at least one example, a computer program product is further provided. When executed, the computer program product is configured to implement functions of various operations of the above method implementations.

It should be understood that, "multiple" herein refers to two or more. "And/or" describes the relationship of the related objects, indicating that there can be three relationships. For example, "A and/or B" can indicate three cases: "A" exists alone, "A" and "B" exist at the same time, and "B" exists alone. The character "/" generally indicates that the relationship of the related objects is "or".

In the above implementations, the sequence numbers are only for description and do not represent the advantages and disadvantages of the implementations.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for resource allocation, applicable to a terminal with an operating system and a target application, the method comprising:
   sending, by the target application, scene information to the operating system through a data channel established with the operating system, wherein the scene information is indicative of a running scene of the target application;
   acquiring, by the operating system, a target optimization configuration file corresponding to the scene information, wherein the target optimization configuration file contains optimization configuration information corresponding to different running time periods in the running scene, and the optimization configuration information is indicative of a manner for system resource allocation;
   acquiring, by the operating system, target optimization configuration information corresponding to a current running time period from the target optimization configuration file; and
   allocating, by the operating system, system resources to the target application according to the target optimization configuration information.

2. The method of claim 1, wherein acquiring, by the operating system, the target optimization configuration file corresponding to the scene information comprises:
   acquiring an application identity of the target application;
   acquiring, according to the application identity, at least two optimization configuration files corresponding to the target application, wherein different optimization configuration files correspond to different running scenes of the target application; and
   acquiring the target optimization configuration file from the at least two optimization configuration files according to a scene identity in the scene information.

3. The method of claim 2, wherein the scene information further comprises a target frame rate in the running scene, and acquiring, by the operating system, the target optimization configuration file from the at least two optimization configuration files according to the scene identity in the scene information comprises:
   acquiring the target optimization configuration file from the at least two optimization configuration files according to the target frame rate and the scene identity, wherein
   in a same running scene, different frame rates correspond to different optimization configuration files.

4. The method of claim 1, wherein acquiring, by the operating system, the target optimization configuration information corresponding to the current running time period from the target optimization configuration file comprises:
   acquiring an entry time point at which the target application enters into the running scene;
   calculating a running duration according to a current time point and the entry time point;
   determining the current running time period according to the running duration; and
   determining optimization configuration information which matches the current running time period as the target optimization configuration information.

5. The method of claim 1, wherein after allocating, by the operating system, system resources to the target application according to the target optimization configuration information,
   a frame rate standard deviation of the target application is lower than a threshold, and power consumption of the terminal is lower than that of the terminal in other manners for system resource allocation, wherein
   the frame rate standard deviation is a standard deviation between a real-time frame rate of the target application and the target frame rate in the running scene.

6. The method of claim 1, further comprising:
   generating an optimization configuration file of the target application by an optimization tool, wherein the optimization tool is used to allocate, in a same running scene of the target application, system resources to the target application according to resource configuration parameters corresponding to sub-scenes, and different sub-scenes correspond to different resource configuration parameters;
   for each sub-scene, calculating a frame rate standard deviation of the target application and power consumption of the terminal in different running time periods;
   for each running time period, determining a sub-scene where the frame rate standard deviation is lower than a threshold and the terminal has a lowest power consumption as a target sub-scene corresponding to the running time period; and
   generating the optimization configuration file corresponding to the running scene according to the target sub-scene corresponding to each running time period.

7. The method of claim 1, further comprising:
   sending, by the operating system, a configuration file acquiring request to a server, wherein the configuration file acquiring request contains a terminal model of the terminal and an application identity of the target application, and the server is configured to feed back to the terminal an optimization configuration file that matches the terminal model and the application identity; and
   receiving and storing, by the operating system, the optimization configuration file fed back by the server.

8. The method of claim 1, wherein the data channel is established with the operating system by one of:
the target application invoking an embedded software development kit (SDK); or
the target application in a socket mode.

9. The method of claim 1, wherein the optimization configuration information comprises at least one of: an on-off state of each core in a central processing unit (CPU), a working frequency of each core in the CPU, a working frequency of a graphics processing unit (GPU), or a working frequency of a memory.

10. A terminal, comprising:
at least one processor; and
a non-transitory computer readable storage, coupled to the at least one processor and storing at least one computer executable instruction thereon which, when executed by the at least one processor, causes the at least one processor to
send scene information to an operating system through a data channel established with the operating system, wherein the scene information is indicative of a running scene of a target application;
acquire a target optimization configuration file corresponding to the scene information, wherein the target optimization configuration file contains optimization configuration information corresponding to different running time periods in the running scene, and the optimization configuration information is indicative of a manner for system resource allocation;
acquire, from the target optimization configuration file, target optimization configuration information corresponding to a current running time period; and
allocate system resources to the target application according to the target optimization configuration information.

11. The terminal of claim 10, wherein the at least one processor configured to acquire the target optimization configuration file corresponding to the scene information is configured to
acquire an application identity of the target application;
acquire, according to the application identity, at least two optimization configuration files corresponding to the target application, wherein different optimization configuration files correspond to different running scenes of the target application; and
acquire the target optimization configuration file from the at least two optimization configuration files according to a scene identity in the scene information.

12. The terminal of claim 11, wherein the scene information further comprises a target frame rate in the running scene, and the at least one processor configured to acquire the target optimization configuration file from the at least two optimization configuration files according to the scene identity in the scene information is configured to
acquire the target optimization configuration file from the at least two optimization configuration files according to the target frame rate and the scene identity, wherein in a same running scene, different frame rates correspond to different optimization configuration files.

13. The terminal of claim 10, wherein the at least one processor configured to acquire the target optimization configuration information corresponding to the current running time period from the target optimization configuration file is configured to
acquire an entry time point at which the target application enters into the running scene;
calculate a running duration according to a current time point and the entry time point;
determine the current running time period according to the running duration; and
determine optimization configuration information which matches the current running time period as the target optimization configuration information.

14. The terminal of claim 10, wherein after the operating system allocates system resources to the target application according to the target optimization configuration information,
a frame rate standard deviation of the target application is lower than a threshold and power consumption of the terminal is lower than that of the terminal in other manners for system resource allocation, wherein
the frame rate standard deviation is a standard deviation between a real-time frame rate of the target application and the target frame rate in the running scene.

15. The terminal of claim 10, wherein the at least one processor is further configured to
generate an optimization configuration file of the target application by an optimization tool, wherein the optimization tool is used to allocate, in a same running scene of the target application, system resources to the target application according to resource configuration parameters corresponding to sub-scenes, and different sub-scenes correspond to different resource configuration parameters;
for each sub-scene, calculate a frame rate standard deviation of the target application and power consumption of the terminal in different running time periods;
for each running time period, determine a sub-scene where the frame rate standard deviation is lower than a threshold and the terminal has a lowest power consumption as a target sub-scene corresponding to the running time period; and
generate the optimization configuration file corresponding to the running scene according to the target sub-scene corresponding to each running time period.

16. The terminal of claim 10, wherein the at least one processor is further configured to
send a configuration file acquiring request to a server, wherein the configuration file acquiring request contains a terminal model of the terminal and an application identity of the target application and the server is configured to feed back to the terminal an optimization configuration file that matches the terminal model and the application identity; and
receive and store the optimization configuration file fed back by the server.

17. The terminal of claim 10, wherein the data channel is established with the operating system by one of:
the target application invoking an embedded software development kit (SDK); or
the target application in a socket mode.

18. The terminal of claim 10, wherein the optimization configuration information comprises at least one of: an on-off state of each core in a central processing unit (CPU), a working frequency of each core in the CPU, a working frequency of a graphics processing unit (GPU), or a working frequency of a memory.

19. A non-transitory computer readable storage medium storing a computer program which, when executed by a processor, causes the processor to
send scene information to an operating system through a data channel established with the operating system, wherein the scene information is indicative of a running scene of a target application;

acquire a target optimization configuration file corresponding to the scene information, wherein the target optimization configuration file contains optimization configuration information corresponding to different running time periods in the running scene, and the optimization configuration information is indicative of a manner for system resource allocation;

acquire, from the target optimization configuration file, target optimization configuration information corresponding to a current running time period; and allocate system resources to the target application according to the target optimization configuration information.

20. The non-transitory computer readable storage medium of claim 19, wherein the computer program executed by the processor to acquire the target optimization configuration file corresponding to the scene information is executed by the processor to acquire an application identity of the target application;

acquire, according to the application identity, at least two optimization configuration files corresponding to the target application, wherein different optimization configuration files correspond to different running scenes of the target application; and acquire the target optimization configuration file from the at least two optimization configuration files according to a scene identity in the scene information.

* * * * *